United States Patent
Jocsak et al.

(10) Patent No.: US 8,646,423 B2
(45) Date of Patent: Feb. 11, 2014

(54) HYBRID POWERTRAIN ASSEMBLY INCLUDING ENGINE WITH VARIABLE VALVE LIFT

(75) Inventors: Jeff Jocsak, Lake Orion, MI (US); Paul R. Nahra, Shelby Township, MI (US); Ramakrishna Tatavarthi, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 80 days.

(21) Appl. No.: 13/417,807

(22) Filed: Mar. 12, 2012

(65) Prior Publication Data

US 2013/0233260 A1    Sep. 12, 2013

(51) Int. Cl.
*F01L 1/34* (2006.01)
(52) U.S. Cl.
USPC ..................... 123/90.16; 123/90.15
(58) Field of Classification Search
USPC ............ 123/90.16, 90.41, 90.15, 90.43
See application file for complete search history.

(56) References Cited

U.S. PATENT DOCUMENTS

| | | | |
|---|---|---|---|
| 6,729,278 B2 * | 5/2004 | Hammoud | 123/90.11 |
| 7,360,515 B2 * | 4/2008 | Hoshino | 123/90.15 |
| 7,607,503 B1 * | 10/2009 | Schechter | 180/165 |

* cited by examiner

*Primary Examiner* — Zelalem Eshete
(74) *Attorney, Agent, or Firm* — Harness, Dickey & Pierce, P.L.C.

(57) ABSTRACT

A powertrain assembly includes a hybrid propulsion system and an internal combustion engine. The hybrid propulsion system includes an electric motor at least partially powering propulsion of a vehicle during a first operating mode and an internal combustion engine at least partially powering propulsion of the vehicle during a second operating mode. The internal combustion engine includes an engine structure defining a combustion chamber and an intake port, an intake valve located in the intake port, and an intake valve lift mechanism supported on the engine structure and engaged with the intake valve. The intake valve lift mechanism is operable in a first lift mode and a second lift mode. The intake valve lift mechanism provides a first intake valve opening profile during the first lift mode and a second intake valve opening profile different than the first intake valve opening profile during the second lift mode.

3 Claims, 4 Drawing Sheets

HYBRID POWERTRAIN ASSEMBLY INCLUDING ENGINE WITH VARIABLE VALVE LIFT

FIELD

The present disclosure relates to hybrid powertrain assemblies.

BACKGROUND

This section provides background information related to the present disclosure which is not necessarily prior art.

Internal combustion engines may combust a mixture of air and fuel in cylinders and thereby produce drive torque. Combustion of the air-fuel mixture produces exhaust gases. Valve lift mechanisms may control opening and closing of intake and exhaust ports to control air flow to the combustion chamber and exhaust flow from the combustion chamber.

SUMMARY

A powertrain assembly may include a hybrid propulsion system and an internal combustion engine. The hybrid propulsion system may include an electric motor configured to at least partially power propulsion of a vehicle during a first operating mode and an internal combustion engine configured to at least partially power propulsion of the vehicle during a second operating mode. The internal combustion engine may include an engine structure defining a combustion chamber and an intake port in communication with the combustion chamber, an intake valve located in the intake port, and an intake valve lift mechanism supported on the engine structure and engaged with the intake valve. The intake valve lift mechanism may be operable in a first lift mode and a second lift mode. The intake valve lift mechanism may provide a first intake valve opening profile during the first lift mode and may provide a second intake valve opening profile different than the first intake valve opening profile during the second lift mode.

A method of controlling a hybrid vehicle may include operating the hybrid vehicle in a first operating mode with a hybrid propulsion system of the vehicle including an electric motor at least partially powering propulsion of the vehicle. The hybrid vehicle may be operated in a second operating mode with an internal combustion engine of the vehicle at least partially powering propulsion of the vehicle. The internal combustion engine may include an engine structure defining a combustion chamber and an intake port in communication with the combustion chamber, an intake valve located in the intake port, and an intake valve lift mechanism supported on the engine structure, engaged with the intake valve, and operable in first and second lift modes. The intake valve lift mechanism may be operated in the first lift mode during a first operating condition of the internal combustion engine and may be operated in the second lift mode during a second operating condition of the internal combustion engine. The first lift mode may provide a first intake valve opening profile and the second lift mode may provide a second intake valve opening profile different than the first intake valve opening profile.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. As used herein, the term "module" refers to an application specific integrated circuit (ASIC), an electronic circuit, and/or a processor (shared, dedicated, or group) and memory that execute one or more software or firmware programs.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
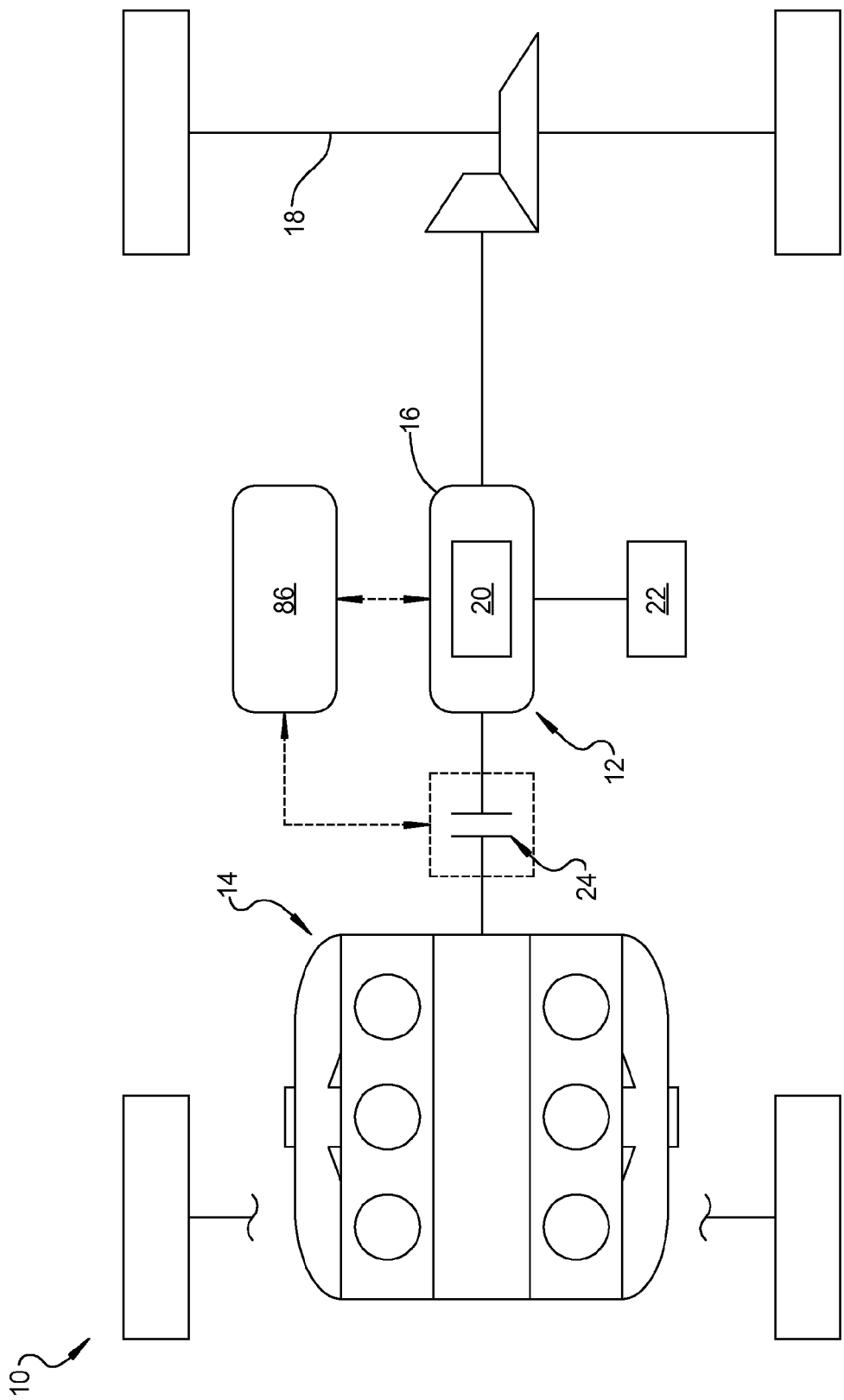
FIG. 1 is a schematic illustration of a hybrid vehicle according to the present disclosure.

A hybrid vehicle 10 is illustrated in FIG. 1 and may include a hybrid propulsion system 12, an internal combustion engine 14, a transmission 16 and a drive axle 18. The hybrid propulsion system 12 may include an electric motor 20 and a rechargeable battery 22. The electric motor 20 and rechargeable battery 22 may form a drive mechanism for the hybrid propulsion system 12. The electric motor 20 may convert power from the battery 22 to mechanical power. The electric motor 20 may additionally be powered by the internal combustion engine 14 and operated as a generator to provide power to charge the battery 22. The hybrid propulsion system 12 may be incorporated into and engaged with the transmission 16. The electric motor 20 may power rotation of the drive axle 18 via the transmission 16.

The internal combustion engine 14 may be coupled to the transmission 16 via a coupling device 24 and may drive the transmission 16. The coupling device 24 may include a friction clutch or a torque converter. The transmission 16 may use the power provided from the internal combustion engine 14 and/or the electric motor 20 to power rotation of the drive axle 18. The combination of the hybrid propulsion system 12, the internal combustion engine 14, the transmission 16 and the coupling device 24 may form a powertrain assembly.

In a first operating mode, the internal combustion engine 14 may be decoupled from the transmission 16 and the electric motor 20 may power rotation of the drive axle 18. The internal combustion engine 14 may be shut off during the first operating mode. In a second operating mode, the internal combustion engine 14 may power rotation of the drive axle 18. In the second operating mode, the internal combustion engine 14 may additionally drive the electric motor 20 to charge the battery 22. In a third operating mode, the electric motor 20 and the internal combustion engine 14 may both power rotation of the drive axle 18.

Figure 2:
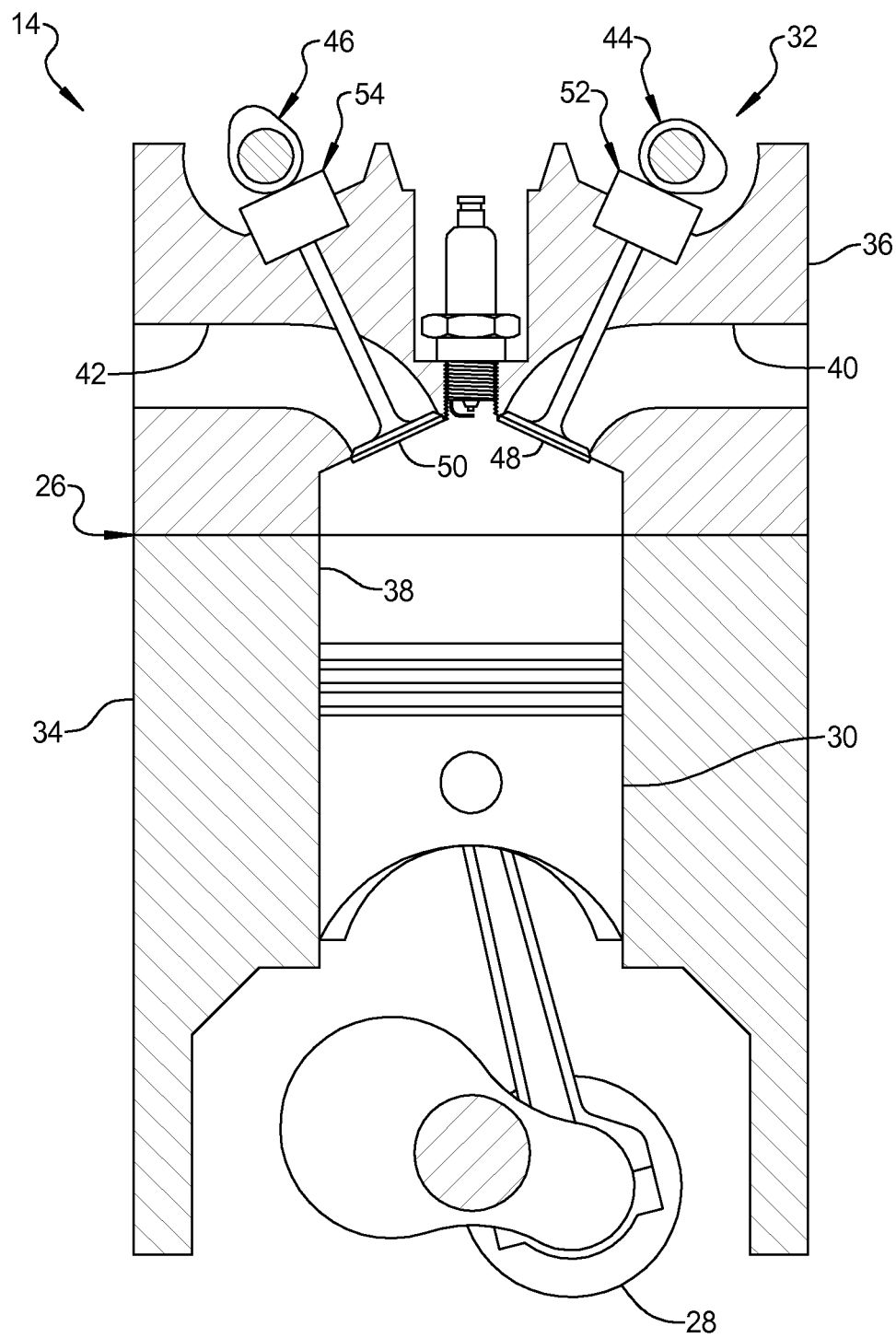
FIG. 2 is a schematic fragmentary section view of the engine assembly from the hybrid vehicle of FIG. 1.
Figure 3:
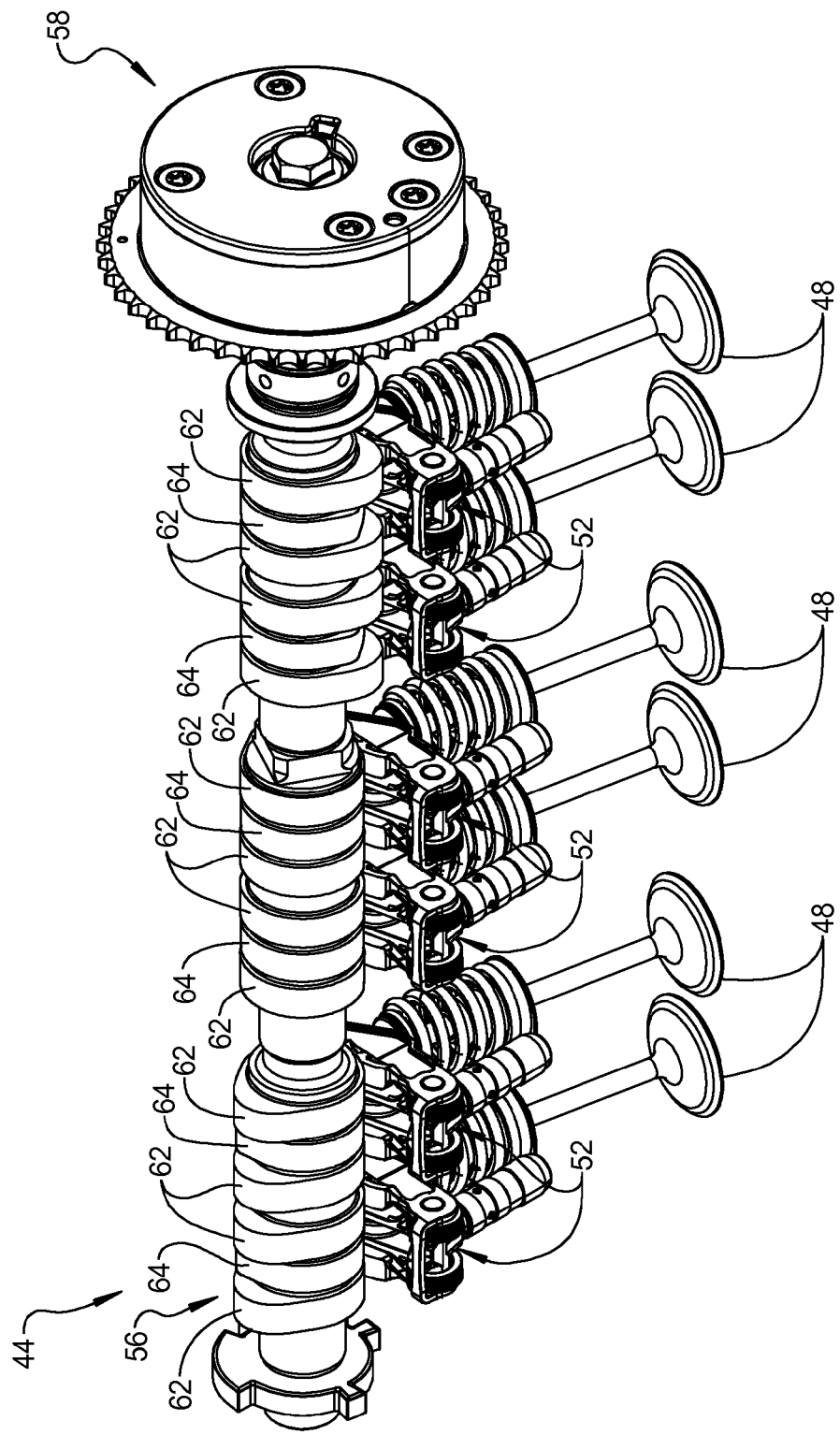
FIG. 3 is a perspective view of the valvetrain assembly included in the engine assembly of FIG. 2.

With additional reference to FIGS. 2 and 3, the internal combustion engine 14 may include an engine structure 26, a crankshaft 28, pistons 30, and a valvetrain assembly 32. The engine structure 26 may include an engine block 34 and a cylinder head 36. The engine structure 26 may define cylinder bores 38 in the engine block 34. The cylinder head 36 cooperates with the cylinder bores 38 and the pistons 30 to define combustion chambers.

A V6 engine configuration is schematically shown in FIG. 1 for illustration purposes only with a single cylinder illustrated in the section view shown in FIG. 2 for simplicity. It is understood that the features discussed relative to the cylinder shown in FIG. 2 apply equally to the remaining cylinders of the engine 14. Additionally, it is understood that the present teachings apply to any number of piston-cylinder arrangements and a variety of reciprocating engine configurations including, but not limited to, V-engines, inline engines, and horizontally opposed engines, as well as both overhead cam and cam-in-block configurations.

The engine structure 26 may define intake and exhaust ports 40, 42 in communication with the combustion chamber. The valvetrain assembly 32 may include intake and exhaust camshaft assemblies 44, 46, intake valves 48 located in the intake ports 40, exhaust valves 50 located in the exhaust ports 42, intake valve lift mechanisms 52 and exhaust valve lift mechanisms 54. As seen in FIG. 3, the intake camshaft assembly 44 may include a camshaft 56 and a cam phaser 58. The camshaft 56 may be supported on the engine structure 26 and may include lobe sets engaged with each of the intake valve lift mechanisms 52. Each lobe set may include a pair of outer lobes 62 and an inner lobe 64. The cam phaser 58 may be coupled to the camshaft 56 to rotationally displace the camshaft during engine operation.

Figure 4:
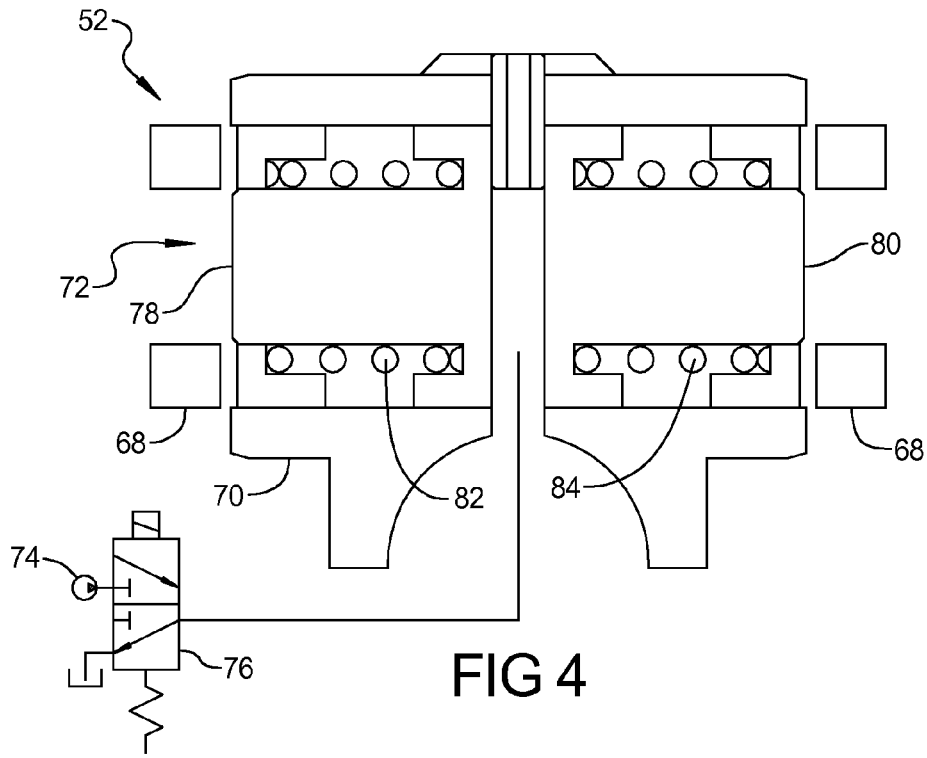
FIG. 4 is a schematic section view of a first intake valve lift mechanism from the valvetrain assembly shown in FIG. 3.
Figure 5:
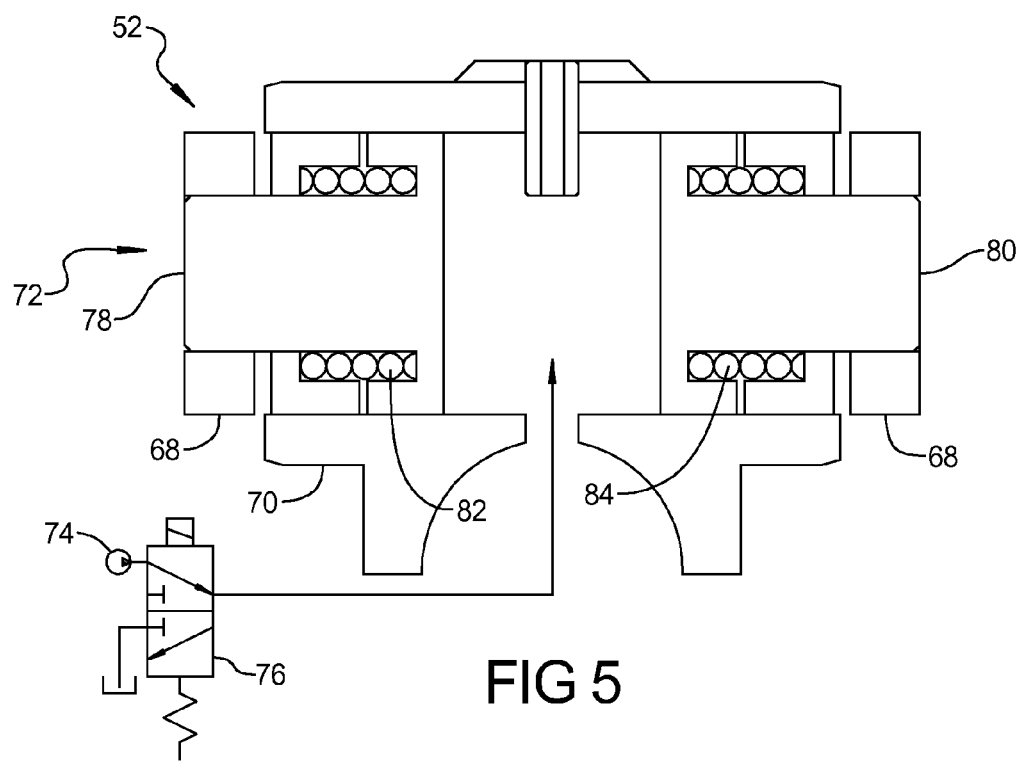
FIG. 5 is an additional schematic section view of the first intake valve lift mechanism shown in FIG. 4.

The intake valve lift mechanisms 52 may each form a multi-step valve lift mechanism supported on the engine structure 26 and engaged with an intake valve 48. As seen in FIGS. 3-5, in the present non-limiting example the intake valve lift mechanism 52 may be in the form of a rocker arm including first and second members 68, 70 and a locking mechanism 72. The outer lobes 62 may be engaged with the first member 68 and the inner lobe 64 may be engaged with the second member 70.

The intake valve lift mechanism 52 may be operable in a first lift mode and a second lift mode. The locking mechanism 72 may secure the first and second members 68, 70 for displacement with one another during the first lift mode and may allow relative displacement between the first and second members 68, 70 during the second lift mode. The intake valve lift mechanism 52 may be in communication with a pressurized fluid supply 74 via a valve 76 to actuate the intake valve lift mechanism 52 between the first and second lift modes.

The locking mechanism 72 may include first and second lock pins 78, 80 and first and second biasing members 82, 84 housed within the second member 70. The locking mechanism 72 may be displaceable between an unlocked position (FIG. 4) and a locked position (FIG. 5). In the unlocked position, the first and second biasing members 82, 84 may force the first and second lock pins 78, 80 inward toward one another and out of engagement with the first member 68, allowing relative displacement between the first and second members 68, 70 during the first lift mode (FIG. 4). When operation in the second lift mode (FIG. 5) is desired, the valve 76 may provide communication between the pressurized fluid 74 and the intake valve lift mechanism 52 to displace the locking mechanism 72 to the locked position. The pressurized fluid 74 may displace the first and second lock pins 78, 80 outward from one another against the force applied by the first and second biasing members 82, 84 and into engagement with the first member 68.

The engagement between the camshaft 56 and the intake valve lift mechanism 52 may provide a first intake valve opening profile during the first lift mode and a second intake valve opening profile during the second lift mode. The first and second intake valve opening profiles may be different. The first lift mode may include a first intake valve opening duration that is greater than a second intake valve opening duration provided by the second lift mode. The first intake valve opening duration may correspond to greater than two hundred and seventy-five degrees (275°) of crankshaft rotation after a top dead center position of the piston 30 starting an intake stroke of the piston 30, and more specifically between two hundred and eighty degrees (280°) and three hundred degrees) (300°) of crankshaft rotation. In the present non-limiting example, the first intake valve opening duration may correspond to approximately two hundred and ninety degrees (290°) of crankshaft rotation.

The second intake valve opening duration may correspond to greater than two hundred and twenty-five degrees (225°) of crankshaft rotation and may be at least ten percent (10%) less than the first intake valve opening duration. In the present non-limiting example, the second intake valve opening duration may correspond to approximately two hundred and fifty degrees (250°) of crankshaft rotation.

Additionally, or alternatively, the first lift mode may include a first intake valve lift height that is greater than a second intake valve lift height during the second lift mode. The first intake valve lift height may be at least ten millimeters (10 mm). In the present non-limiting example, the second intake valve lift height may be between fifty percent (50%) and seventy-five percent (75%) of the first intake valve lift height.

The combination of a multi-step valve lift mechanism and a hybrid powertrain assembly may generally provide the ability to have different valve opening profiles than are currently available in traditional (non-hybrid) multi-step valve lift arrangements or in hybrid arrangements using fixed valve lift mechanisms.

Operation of the hybrid vehicle 10 may include starting the internal combustion engine 14 quickly and often. In order to limit the effect of the engine starting event experienced by a user, a low effective compression ratio may be used during engine start. This may be accomplished with a later than conventional intake valve closing with the cam phaser 58 in a parked position. For example, the closing of intake valves 48 may be delayed by at least ten Degrees (10°) relative to a conventional (non-hybrid) vehicle. The first lift mode may enable late intake valve closing for smooth engine start-up and high-speed (greater than three thousand revolutions per minute (3000 RPM)) power from the internal combustion engine 14.

The second lift mode may improve engine efficiency in the range that the hybrid vehicle 10 operates the internal combustion engine 14 (typically less than 3000 RPM and greater than six bar brake mean effective pressure (6 bar BMEP)). The second lift mode may be employed up to and including full load operation at low speeds (less than 3000 RPM). This differs from conventional multi-step implementations which may employ shorter second lift modes (typically less than 160°) to improve engine efficiency at low speed and light loads (less than 3000 RPM and less than 6 bar BMEP).

Specifically, a control module 86 may be included in the powertrain assembly and may be in communication with the hybrid propulsion system 12, the internal combustion engine 14, the transmission 16 and the coupling device 24 to control operation of the powertrain assembly between the first, second and third operating modes. The intake valve lift mechanism 52 may be operated in the first lift mode during engine start-up, such as during transition from the first operating mode to the second operating mode. The later intake valve closing provided by the first lift mode provides a lower effective compression ratio than typical fixed lift and multi-step lift arrangements. This intake valve closing may generally mitigate a transition from engine-off to engine-on felt by a driver. The first lift mode may also be employed during high speed power requirements.

The intake valve lift mechanism 52 may be operated in the second lift mode during engine operation in the second and third operating modes at low speed conditions (engine speeds less than 3000 RPM). The second lift mode may generally accommodate the low speed, high load operation typically encountered during operation in the third operating mode.

What is claimed is:

1. A powertrain assembly comprising:
  a hybrid propulsion system including an electric motor configured to at least partially power propulsion of a vehicle during a first operating mode; and
  an internal combustion engine configured to at least partially power propulsion of the vehicle during a second operating mode and including:
    an engine structure defining a combustion chamber and an intake port in communication with the combustion chamber;
    an intake valve located in the intake port;
    an intake valve lift mechanism supported on the engine structure and engaged with the intake valve, the intake valve lift mechanism operable in a first lift mode and a second lift mode, the intake valve lift mechanism providing a first intake valve opening profile during the first lift mode and providing a second intake valve opening profile different than the first intake valve opening profile during the second lift mode, wherein the first lift mode includes an intake valve opening duration that is greater than an intake valve opening duration provided by the second lift mode, wherein the first lift mode includes the intake valve closing at least 275 degrees of crankshaft rotation after a top dead center position of an intake stroke of a piston located in the combustion chamber, wherein the second lift mode includes an opening duration of the intake valve corresponding to at least 225 degrees of crankshaft rotation, wherein the first lift mode includes a first intake valve lift height that is greater than a second intake valve lift height provided by the second lift mode, wherein the second intake valve lift height is 50 percent to 75 percent of first intake valve lift height; and
  a control module in communication with the internal combustion engine and the hybrid propulsion system, the control module operating the internal combustion engine in the first lift mode during starting of the internal combustion engine and the first lift mode providing a greater opening of the intake valve than the second lift mode; and
  a camshaft supported on the engine structure and engaged with the intake valve lift mechanism, the engagement between the camshaft and the intake valve lift mechanism providing the first and second intake valve opening profiles.

2. The powertrain assembly of claim 1, wherein the first operating mode includes the hybrid propulsion system solely propelling the vehicle, the second operating mode includes the internal combustion engine solely propelling the vehicle, and a third operating mode includes a combination of the hybrid propulsion system and the internal combustion engine propelling the vehicle.

3. A method comprising:
  operating a hybrid vehicle in a first operating mode with a hybrid propulsion system of the vehicle including an electric motor at least partially powering propulsion of the vehicle;
  operating the hybrid vehicle in a second operating mode with an internal combustion engine of the vehicle at least partially powering propulsion of the vehicle, the internal combustion engine including an engine structure defining a combustion chamber and an intake port in communication with the combustion chamber, an intake valve located in the intake port, and an intake valve lift mechanism supported on the engine structure, engaged with the intake valve, and operable in first and second lift modes, wherein the first lift mode includes an intake valve opening duration that is greater than an intake valve opening duration provided by the second lift mode;
  operating the intake valve lift mechanism in the first lift mode during a first operating condition of the internal combustion engine, the first lift mode providing a first intake valve opening profile, wherein the engine is operated in the first lift mode during start-up of the engine and at engine speeds greater than 3000 revolutions per minute, wherein the first lift mode includes the intake valve closing at least 275 degrees of crankshaft rotation after a to dead center position of an intake stroke of a piston located in the combustion chamber; and operating the intake valve lift mechanism in the second lift mode during a second operating condition of the internal combustion engine, wherein the engine is operated in the second lift mode at engine speeds less than 3000 revolutions per minute, providing a second intake valve opening profile different than the first intake valve opening profile, wherein the first lift mode includes an intake valve opening duration that is greater than an intake valve opening duration provided by the second lift mode, wherein the second lift mode includes an opening duration of the intake valve corresponding to at least 225 degrees of crankshaft rotation, wherein the first lift mode includes a first intake valve lift height that is greater than a second intake valve lift height provided by the second lift mode, wherein the second intake valve lift height is 50 percent to 75 percent of first intake valve lift height.

* * * * *